United States Patent Office 3,826,857
Patented July 30, 1974

3,826,857
HARD CANDY
Harold E. Horn, Oak Lawn, and Martin M. Godzicki, Chicago, Ill., assignors to CPC International Inc.
No Drawing. Continuation-in-part of abandoned application Ser. No. 748,155, July 29, 1968. This application Apr. 30, 1971, Ser. No. 139,194
Int. Cl. A23g 3/00
U.S. Cl. 426—214
8 Claims

ABSTRACT OF THE DISCLOSURE

Hard candy containing a significant proportion of a low D.E. starch hydrolysate. The hard candy has improved hygroscopicity characteristics, contains more water than conventional hard candy, and yet is hard and clear.

---

This application is a continuation-in-part of our copending application Ser. No. 748,155, filed July 29, 1968, now abandoned.

The present invention relates to a hard candy product. More particularly, the present invention relates to a hard candy having improved hygroscopicity characteristics while simultaneously having a higher moisture content than commercially available hard candies.

Hard candy is a confection which has been formed into desired shape and size, and generally, is composed of sucrose and corn syrup with or without added flavor and color. Most generally, hard candy contains less than about 2% by weight moisture. This low moisture content is necessary to provide the candy with reasonable storage stability. If the moisture content is significantly increased, the candy becomes sticky on the exterior. Such candy cannot be readily packaged in jars or similar containers since individual candies will stick to each other, as well as to the walls of the container, making removal practically impossible.

Wrapping of candy having a moisture content above about 2% by weight similarly presents problems. The wrapper of such candy typically adheres tenaciously to the candy. It is a common and frustrating experience of not being able to separate such candy from the wrapper.

To avoid the various described problems, candy manufacturers process the candy to very low moisture contents, such as those well below 1% by weight. Such processing requires elevated temperatures, long cooking times, as well as the removal of water under vacuum. Long cooking times at elevated temperatures, however, cause the formation of color in the product. This color formation is a major problem in the manufacture of clear, white candy of good storage stability.

It is an object of the present invention to provide a hard candy having a relatively high moisture content, but which simultaneously exhibits excellent storage stability, improved resistance to moisture pick-up and which does not require stringent processing conditions, and which has a high gloss.

It is another object of the present invention to provide a hard candy having an increased moisture content compared to conventional hard candies and which, nevertheless, is not hygroscopic.

It is still a further object of the present invention to provide a simple and economic process for the manufacture of a hard candy of improved characteristics.

Yet another object of the present invention is to provide a hard candy which, when subjected to high humidity conditions, does not become sticky.

Other objects of the present invention will be apparent hereinafter from the following description and from the recitals of the appended claims.

It has now been surprisingly found that a hard candy of excellent color, low hygroscopicity, and which does not become sticky upon standing, but which nevertheless has a moisture content ranging from about 4% to about 8% by weight can be readily prepared by procedures hereinafter described.

As a result of the relatively high moisture content which is permitted in the hard candies of this invention, mild processing conditions such as lower temperatures and shorter cooking times can be employed during the manufacture of these candies. These mild processing conditions obviate color formation and facilitate the preparation of clear, water-white hard candies.

The above advantages are realized in a hard candy containing at least about 10% by weight of a starch hydrolysate having a D.E. from about 5 to about 25 and a descriptive ratio of at least about 2.0 and containing from about 4% to about 8% by weight moisture.

The hard candy containing the low D.E. starch hydrolysate may be any type of hard candy, such as clear hard candy, pulled hard candy, grained hard candy, filled hard candy, or the like. In addition to one or more sugar constituents and the starch hydrolysate, the hard candy may also contain added flavor, color, or acid.

The sugar constituent is a conventional sugar constituent used in the manufacture of hard candy such as sucrose, dextrose, levulose, corn syrup and the like. One or more sugar constituents may be used. For example, a typical formula for the hard candy of the present invention may contain anywhere from 10% to 70% sucrose, from 10% to 60% corn syrup, and at least about 10% of the starch hydrolysate, preferably about 10% to about 50%.

The starch hydrolysates used in the formulas for making the hard candy are a relatively new class of starch materials. These starch hydrolysates are made by subjecting a source of starch to enzyme or acid treatment or a combination of both. It is important that the starch hydrolysate having a relatively low D.E. (dextrose equivalent) of say less than about 25 and most preferably have a D.E. in the range from 5 to 25. The most preferred materials have a D.E. within the range of 5 to 15. Starch hydrolysates of this type have been found to be excellent agents useful in reducing moisture pick-up of normally hygroscopic edible foods whereas use of other hydrolysates having a D.E. substantially outside this range results in inferior hard candies which still show a tendency to entrap moisture, thus becoming sticky.

The term "D.E." is used herein to refer to the reducing sugars content of the dissolved solids in a starch hydrolysate expressed as percent dextrose as measured by the Luff-Schoorl method (NBS Circular C-40, page 195, as appearing in "Polarimetry, Saccharimetry, and the Sugars" authors Frederick J. Bates and Associates).

The initial starch which is subjected to hydrolytic treatment may be derived from a wide variety of starchy materials, such as cereal starches, waxy starches, and/or root starches. Typical of these groups are corn starch, potato starch, tapioca starch, grain sorghum starch, waxy milo starch, waxy maize starch, rice starch and the like. The term "starch hydrolysate" as used herein encompasses hydrolyzed starchy materials derived from a wide variety of starch sources known in the industry.

As hereinbefore stated, the starch hydrolysates preferred for use in the present invention are those having a D.E. ranging from about 5 to about 25 and which are made by any number of specific methods.

In one method a starch such as a waxy starch is treated with a single enzyme application of bacterial alpha-amylase. More specifically, an aqueous slurry of a waxy starch, having a solids content less than 50%, is subjected to the hydrolytic action of bacterial alpha-amylase under suitable conditions of fermentation to produce a starch hydrolysate. The hydrolysate may be further characterized as having the sum of the percentages (dry basis) of saccharides therein with a degree of polymerization of 1 to 6 divided by the D.E. to provide a ratio greater than about 2.0. This ratio is referred to as the characteristic or descriptive ratio. These low D.E. products having a descriptive ratio less than about 2 are somewhat undesirable in that they exhibit less water solubility and also tend to form haze in solution as compared to those products with a ratio of at least 2. Thus, those low D.E. hydrolysates possessing a descriptive ratio of less than 2, when combined with the sugar constituents in a hard candy, form a cloudy hard candy composition. Those low D.E. hydrolysates having a descriptive ratio greater than about 2 do not in any way impede the natural clearness of the hard candy composition.

The same product as described above, may also be made via a number of other routes. For example, a mixture of starch and water having a solids content less than 50% may be first subjected to the hydrolytic action of a bacterial alpha-amylase followed by a high temperature heating step to solubilize any unsolubilized starch. Since this temperature tends to inactivate the enzyme, it is then necessary to cool the solubilized partial hydrolysate and subject it to a second hydrolysis by treatment with additional bacterial alpha-amylase to obtain the final starch hydrolysate.

A third method of making the preferred class of low D.E. starch hydrolysates consists of hydrolyzing a mixture of starch and water by the action of acid to reach a D.E. between about 5 and about 15. The partial hydrolysate is subsequently subjected to the action of bacterial alpha-amylase to obtain a starch hydrolysate having a D.E. of from about 10 to about 25.

A particularly preferred starch hydrolysate useful in the present invention has the following specifications: moisture content about 5% maximum, D.E. 10–13, pH 4.5–5.5 at 10% solids, average bulk density 28–35 pounds per cubic foot.

In order to make the hard candy composition, it has been found necessary to intimately admix a sugar constituent, water, and the starch hydrolysate to obtain a homogeneous mixture which, when subjected to a heat treatment, forms a solution. The mixture is heated to an elevated temperature to form a solution and to drive off sufficient water to form a composition containing from about 4% to about 8% moisture. It is desirable to heat the mixture to a temperature of less than about 300° F., preferably from about 250° F. to about 300° F. At this point the solution is cooled sufficiently (to less than 240° F.) to permit forming of a plastic composition (candy dough) so that it may be kneaded, pulled, molded, or otherwise formed as in conventional hard candy manufacturing procedures. Upon cooling to room temperature, substantially non-hygroscopic hard candy is obtained that is typically characteristic of the treatment that it has received.

In a typical example, 30 parts of sucrose and 30 parts of 10 D.E. starch hydrolysate are mixed with 12 parts of water to which is added 40 parts of corn syrup. All parts and percentages now and hereinafter are by weight unless otherwise formed as in conventional hard candy manufacture of about 270° F., whereupon the substance exhibits a solids content of 95% and then the molten mixture is allowed to cool to about 200°–220° F., thereby forming a plastic composition. The plastic composition is then molded or otherwise treated and allowed to harden to form a hard candy of high moisture content and excellent resistance to moisture pick-up.

The following example further illustrates the hard candies of the present invention and the method of their preparation. All percentages are by weight and temperatures in degrees Fahrenheit.

EXAMPLE

In the preparation of several batches of hard candies, four basic formulae were used for the sugar constituent. These formulae were as follows:

Basic Formula (dry basis)

Type:
I ---------------- 70% sucrose+30% corn syrup.
II --------------- 60% sucrose+40% corn syrup.
III -------------- 50% sucrose+50% corn syrup.
IV --------------- 40% sucrose+60% corn syrup.

The corn syrup was a high maltose corn syrup (although any corn syrup or like syrup is satisfactory) having a Baumé of 43° (80.3% solids), a D.E. of 48 and a maltose content of about 52%. Table 1 below sets forth the proportions of constituents used in each sample, as well as the preparation conditions, and product analyses. It may be noted that for each type of hard candy produced, one control sample, without the starch hydrolysate, was prepared.

The starch hydrolysates were incorporated into the basic formulae by substituting a portion of the sucrose.

The starch hydrolysate was prepared by hydrolysis of waxy milo starch with bacterial alpha-amylase to a D.E. in the range of 10–13. The starch hydrolysate was a spray dried product containing less than 10% moisture.

It may also be noted that the control samples were cooked at a temperature of 310°–315° F., whereas the samples containing the starch hydrolysate were cooked at a temperature of 300° F., or less.

As each sample was prepared, the constituents were added in quantities to yield 10 pounds of dry substance. Water added ranged from 2 pounds to 10 pounds for each sample, depending on how much water was already present in the corn syrup. As mentioned before, sufficient water was added to form a solution at the elevated temperature used during cooking.

The properties of the prepared candies are shown in Table 1.

TABLE 1

| Sample | Cook temp., °F. | Percent Starch hydrolysate | Percent Water in final product | Relative humidity | Percent moisture gain in— | | | | | Color | Clarity | Texture | Acceptability rating |
|---|---|---|---|---|---|---|---|---|---|---|---|---|---|
| | | | | | 6 hrs. | 12 hrs. | 1 day | 4 days | 7 days | | | | |
| I, control | 315 | 0 | 0.2 | 50 | 0.2 | 0.3 | 0.4 | 0.8 | 0.8 | 2 | 1 | 1 | A |
| | | | | 70 | 1.1 | 1.3 | 1.7 | 3.4 | 4.0 | | | | |
| | | | | 90 | 2.0 | 2.5 | 3.6 | 9.3 | 14.6 | | | | |
| ID | 250 | 40 | 6.6 | 50 | 0 | 0 | 0.1 | 0.3 | 0.4 | 1 | 2 | 2 | B |
| | | | | 70 | 0.6 | 0.8 | 1.2 | 3.3 | 4.5 | | | | |
| | | | | 90 | 1.5 | 2.3 | 3.7 | 11.3 | 17.1 | | | | |
| IE | 245 | 50 | 6.0 | 50 | 0 | 0 | 0.1 | 0.3 | 0.3 | 1 | 4 | 2 | C |
| | | | | 70 | 0.6 | 0.7 | 1.1 | 2.8 | 3.7 | | | | |
| | | | | 90 | 1.5 | 2.2 | 3.9 | 10.8 | 17.4 | | | | |
| II, control | 310 | 0 | 1.7 | 50 | 0 | 0 | 0 | 0 | 0 | 3 | 1 | 2 | B |
| | | | | 70 | 0.2 | 0.2 | 0.3 | 0.8 | 1.1 | | | | |
| | | | | 90 | 1.4 | 2.3 | 4.1 | 13.3 | 19.3 | | | | |
| IIB | 270 | 20 | 4.2 | 50 | 0 | 0 | 0 | 0 | 0 | 1 | 1 | 1 | A |
| | | | | 70 | 0.2 | 0.2 | 0.2 | 0.5 | 0.6 | | | | |
| | | | | 90 | 1.4 | 2.1 | 3.3 | 9.6 | 14.5 | | | | |
| IIC | 250 | 30 | 5.5 | 50 | 0 | 0 | 0 | 0 | 0 | 1 | 2 | 2 | B |
| | | | | 70 | 0.1 | 0.1 | 0.1 | 0.3 | 0.4 | | | | |
| | | | | 90 | 1.4 | 1.6 | 2.1 | 6.1 | 12.0 | | | | |

See footnotes at end of table.

TABLE I—Continued

| Sample | Cook temp., °F. | Percent Starch hydrolysate | Percent Water in final product | Relative humidity | Percent moisture gain in— 6 hrs. | 12 hrs. | 1 day | 4 days | 7 days | Color | Clarity | Texture | Acceptability rating |
|---|---|---|---|---|---|---|---|---|---|---|---|---|---|
| III, control | 310 | 0 | 1.2 | 50 | 0 | 0 | 0 | 0 | 0 | 3 | 1 | 2 | B |
|  |  |  |  | 70 | 0.2 | 0.3 | 0.3 | 0.6 | 0.8 |  |  |  |  |
|  |  |  |  | 90 | 1.8 | 2.5 | 3.8 | 11.4 | 18.3 |  |  |  |  |
| IIIA | 265 | 10 | 5.3 | 50 | 0 | 0 | 0 | 0 | 0 | 1 | 2 | 2 | B |
|  |  |  |  | 70 | 0.2 | 0.2 | 0.2 | 0.4 | 0.6 |  |  |  |  |
|  |  |  |  | 90 | 1.9 | 2.6 | 3.9 | 10.7 | 15.9 |  |  |  |  |
| IIIB | 275 | 20 | 4.4 | 50 | 0 | 0 | 0 | 0 | 0 | 1 | 2 | 2 | B |
|  |  |  |  | 70 | 0.1 | 0.1 | 0.2 | 0.4 | 0.6 |  |  |  |  |
|  |  |  |  | 90 | 1.5 | 2.1 | 3.2 | 9.1 | 13.5 |  |  |  |  |
| IIIC | 250 | 30 | 7.3 | 50 | 0 | 0 | 0 | 0 | 0 | 1 | 2 | 2 | B |
|  |  |  |  | 70 | 0.1 | 0.1 | 0.1 | 0.1 | 0.2 |  |  |  |  |
|  |  |  |  | 90 | 1.1 | 1.4 | 2.1 | 6.2 | 10.5 |  |  |  |  |
| IIID | 240 | 40 | 8.4 | 50 | 0 | 0 | 0 | 0.1 | 0.1 | 1 | 3 | 2 | B |
|  |  |  |  | 70 | 0 | 0 | 1.4 | 3.8 | 6.1 |  |  |  |  |
|  |  |  |  | 90 | 0.8 | 1.0 | 0.8 | 1.1 | (blank) |  |  |  |  |
| IV, control | 305 | 0 | 1.2 | 50 | 0.2 | 0.3 | 0.4 | 0.8 | 1.1 | 3 | 1 | 2 | B |
|  |  |  |  | 70 | 0.9 | 1.3 | 2.0 | 6.1 | 9.5 |  |  |  |  |
|  |  |  |  | 90 | 2.2 | 4.2 | 6.2 | 20.5 | 29.4 |  |  |  |  |
| IVA | 265 | 10 | 4.4 | 50 | 0 | 0 | 0 | 0 | 0 | 1 | 3 | 2 | B |
|  |  |  |  | 70 | 0.7 | 0.8 | 1.0 | 2.3 | 3.1 |  |  |  |  |
|  |  |  |  | 90 | 2.0 | 2.8 | 4.4 | 13.1 | 20.5 |  |  |  |  |
| IVB | 260 | 20 | 5.1 | 50 | 0.1 | 0.1 | 0.2 | 0.4 | 0.5 | 1 | 3 | 2 | B |
|  |  |  |  | 70 | 0.6 | 0.8 | 1.3 | 3.7 | 5.3 |  |  |  |  |
|  |  |  |  | 90 | 1.3 | 2.1 | 3.8 | 12.7 | 19.7 |  |  |  |  |
| IVC | 260 | 30 | 5.3 | 50 | 0 | 0 | 0 | 0 | 0 | 1 | 3 | 2 | B |
|  |  |  |  | 70 | 0.1 | 0.1 | 0.1 | 0.2 | 0.4 |  |  |  |  |
|  |  |  |  | 90 | 1.0 | 1.4 | 2.1 | 6.9 | 12.5 |  |  |  |  |

Note.—See the following table:

|  | A | B | C |
|---|---|---|---|
| Color | 1, 2 | 3 | 4, 5 |
| Clarity | 1, 2 | 3 | 4, 5 |
| Texture | 1 | 2 | 3 |

Note.—A=Excellent; B=Good; C=Fair.

The improved and unexpected properties of the candies of the present invention were demonstrated in an experiment wherein the moisture pick-up of candies containing no low D.E. starch hydrolysates was compared with the moisture pick-up of identical candies but which contain 35% by weight of a starch hydrolysate having a D.E. of about 10.5. In this experiment, all candies were of Type III (50% sucrose+50% corn syrup) and were prepared by the procedures heretofore described. The moisture pick-up of candies having a moisture content of both about 4% and about 8% by weight after various periods and at 50%, 75% and 90% relative humidity, is set forth in Tables 2 through 4.

TABLE 2.—MOISTURE PICK-UP OF CANDY AT 50% RELATIVE HUMIDITY

| Candy number | Percent Moisture of final product | Percent Starch hydrolysate | Percent moisture gain in— 6 hours | 1 day | 3 days | 7 days |
|---|---|---|---|---|---|---|
| 1 | 3.9 | 0 | 0.13 | 0.35 | 0.60 | 0.89 |
| 2 | 3.9 | 35 | 0.03 | 0.11 | 0.24 | 0.38 |
| 3 | 8.3 | 0 | 0.11 | 0.29 | 0.49 | 0.69 |
| 4 | 7.7 | 35 | 0.04 | 0.11 | 0.23 | 0.34 |

TABLE 3.—MOISTURE PICK-UP OF CANDY AT 75% RELATIVE HUMIDITY

| Candy number | Percent Moisture of final product | Percent Starch hydrolysate | Percent moisture gain in— 6 hours | 1 day | 3 days | 7 days |
|---|---|---|---|---|---|---|
| 1 | 3.9 | 0 | 0.69 | 2.45 | 6.08 | 11.94 |
| 2 | 3.9 | 35 | 0.38 | 1.22 | 2.87 | 5.33 |
| 3 | 8.3 | 0 | 0.62 | 1.95 | 5.20 | 9.52 |
| 4 | 7.7 | 35 | 0.32 | 1.00 | 2.23 | 4.27 |

TABLE 4.—MOISTURE PICK-UP OF CANDY AT 90% RELATIVE HUMIDITY

| Candy number | Percent Moisture of final product | Percent Starch hydrolysate | Percent moisture gain in— 6 hours | 1 day | 3 days | 7 days |
|---|---|---|---|---|---|---|
| 1 | 3.9 | 0 | 1.04 | 3.87 | 10.42 | 20.44 |
| 2 | 3.9 | 35 | 0.56 | 1.85 | 4.86 | 11.91 |
| 3 | 8.3 | 0 | 0.96 | 3.17 | 8.52 | 16.66 |
| 4 | 7.7 | 35 | 0.52 | 1.71 | 4.12 | 10.31 |

It can be readily seen from the data set forth in the above Tables that the candies of the present invention are greatly less hygroscopic than candies prepared without the low D.S. starch hydrolysates. In most instances, the candies containing no low D.E. starch hydrolysates gained over twice the amount of water than the candies prepared with the low D.E. starch hydrolysates in accordance with the present invention.

Although all candy prepared in the example was heated in an open kettle, vacuum cooking or other known cooking methods may be applied. Temperature ranges will vary according to the method used in a manner corresponding to temperature differences observed in conventional candy making procedures.

Hard candies were also prepared as in the example above which also contained added color, flavor and/or acid. These candies also exhibited the excellent characteristics of the samples in the example.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

We claim:

1. A high gloss hard candy having low hygroscopicity, and which does not become sticky upon standing containing sucrose and at least about 10% by weight of a starch hydrolysate having a D.E. from about 5 to about 25 and a descriptive ratio of at least about 2.0, and containing from about 4% to about 8% by weight moisture.

2. The hard candy of claim 1, wherein the starch hydrolysate is present in an amount from about 10% to about 50% by weight.

3. A high gloss hard candy of low hygroscopicity comprising from about 10% to about 70% sucrose, from about 10% to about 60% corn syrup, from about 10% to 50% of a starch hydrolysate having a D.E. from about 5 to about 25 and a descriptive ratio of at least about 2.0, and a moisture content from about 4% to about 8%.

4. The high gloss hard candy of claim 3, wherein the starch hydrolysate has a D.E. from about 10 to about 15, a pH from about 4.5 to about 5.5 at 10% solids, and an average bulk density of about 28 to about 35 pounds per cubic foot.

5. A high gloss hard candy characterized by having improved resistance to stickiness and low hygroscopicity when subjected to high humidity conditions, comprising an admixture of about 30% by weight of sucrose, about 40% by weight corn syrup, and about 30% by weight of a starch hydrolysate having a D.E. of about 10 and a descriptive ratio of at least about 2.0, and having a moisture content from about 4% to about 6% by weight.

6. A process for preparing a high gloss hard candy having improved resistance to stickiness and low hygroscopicity when subjected to high humidity conditions, comprising:
 (1) admixing a sugar constituent containing sucrose, water and a starch hydrolysate having a D.E. from about 5 to about 25 and a descriptive ratio of at least about 2.0, in proportions such that the sugar is present in an amount from about 10% to about 70% by weight, the starch hydrolysate is present in an amount from about 10% to about 50% by weight, and the water content is sufficient so that upon heating the mixture forms a solution;
 (2) heating the solution to a temperature not exceeding about 300° F. until the moisture content of the resulting product is from about 4% to about 8% by weight; and
 (3) cooling to form a plastic composition.

7. Process as in claim 6, wherein the sugar constituent is sucrose and corn syrup combined in proportions of sucrose to corn syrup from about 70:30 to about 40:60 parts by weight.

8. The process as in claim 6 including the additional steps of molding the plastic composition and allowing the composition to cool to form a clear, substantially non-hygroscopic, high gloss hard candy.

References Cited

UNITED STATES PATENTS

| | | | |
|---|---|---|---|
| 3,332,783 | 7/1967 | Frey | 99—134 |
| 3,490,922 | 1/1970 | Hurst | 99—134 |
| 3,663,369 | 5/1972 | Morehouse et al. | 99—142 |

A. LOUIS MONACELL, Primary Examiner

J. M. HUNTER, Assistant Examiner

U.S. Cl. X.R.

426—380